No. 658,068. Patented Sept. 18, 1900.
H. J. LAWSON.
MOTOR VEHICLE.
(Application filed Jan. 31, 1900.)
(No Model.) 3 Sheets—Sheet 1.
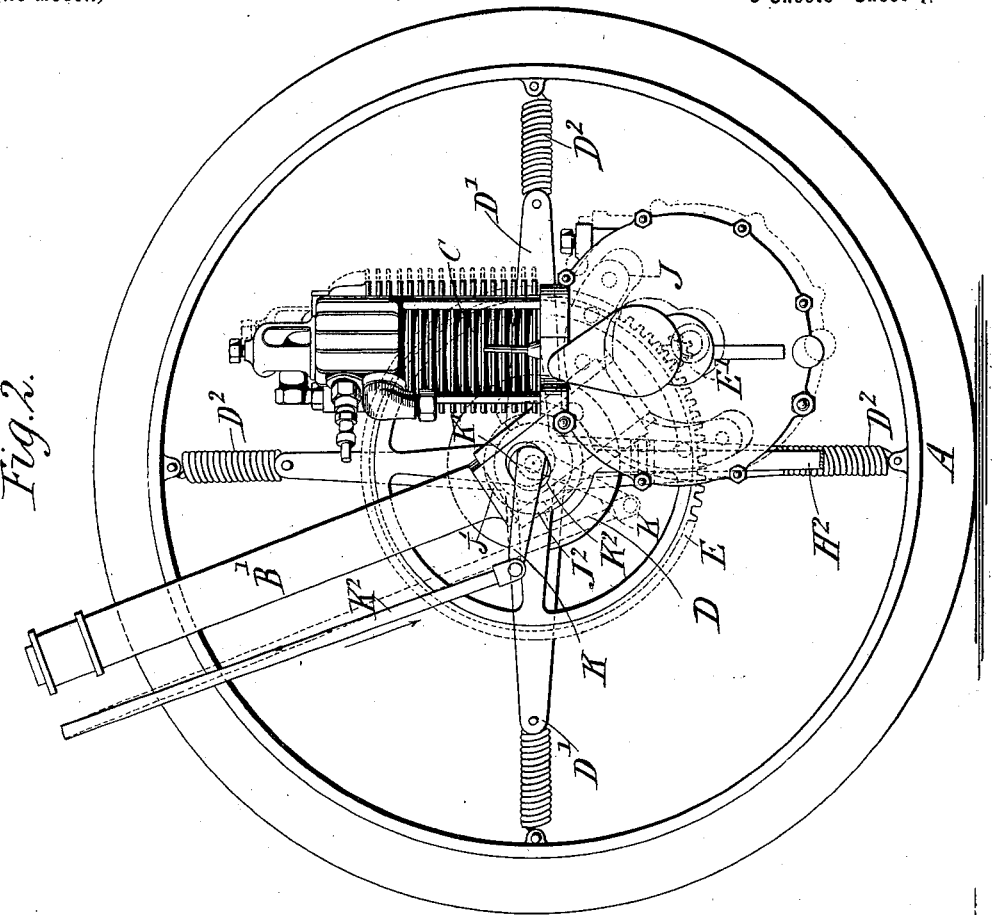
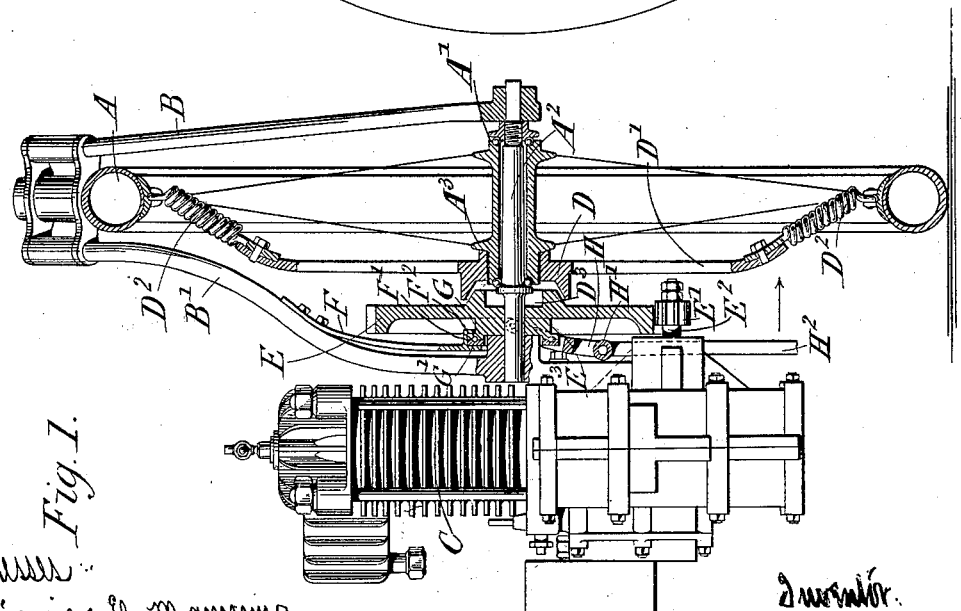

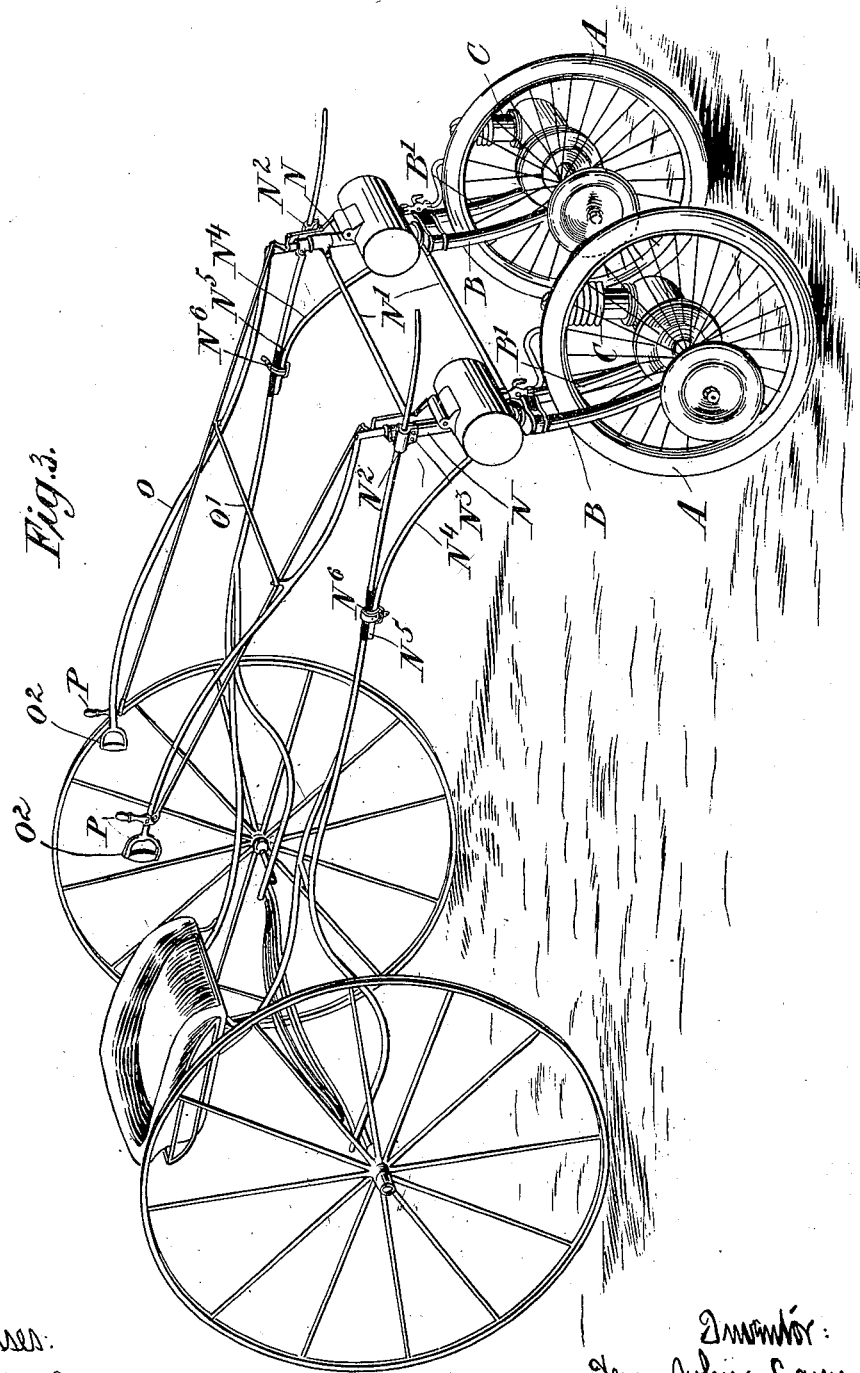

No. 658,068. Patented Sept. 18, 1900.
H. J. LAWSON.
MOTOR VEHICLE.
(Application filed Jan. 31, 1900.)
(No Model.) 3 Sheets—Sheet 3.
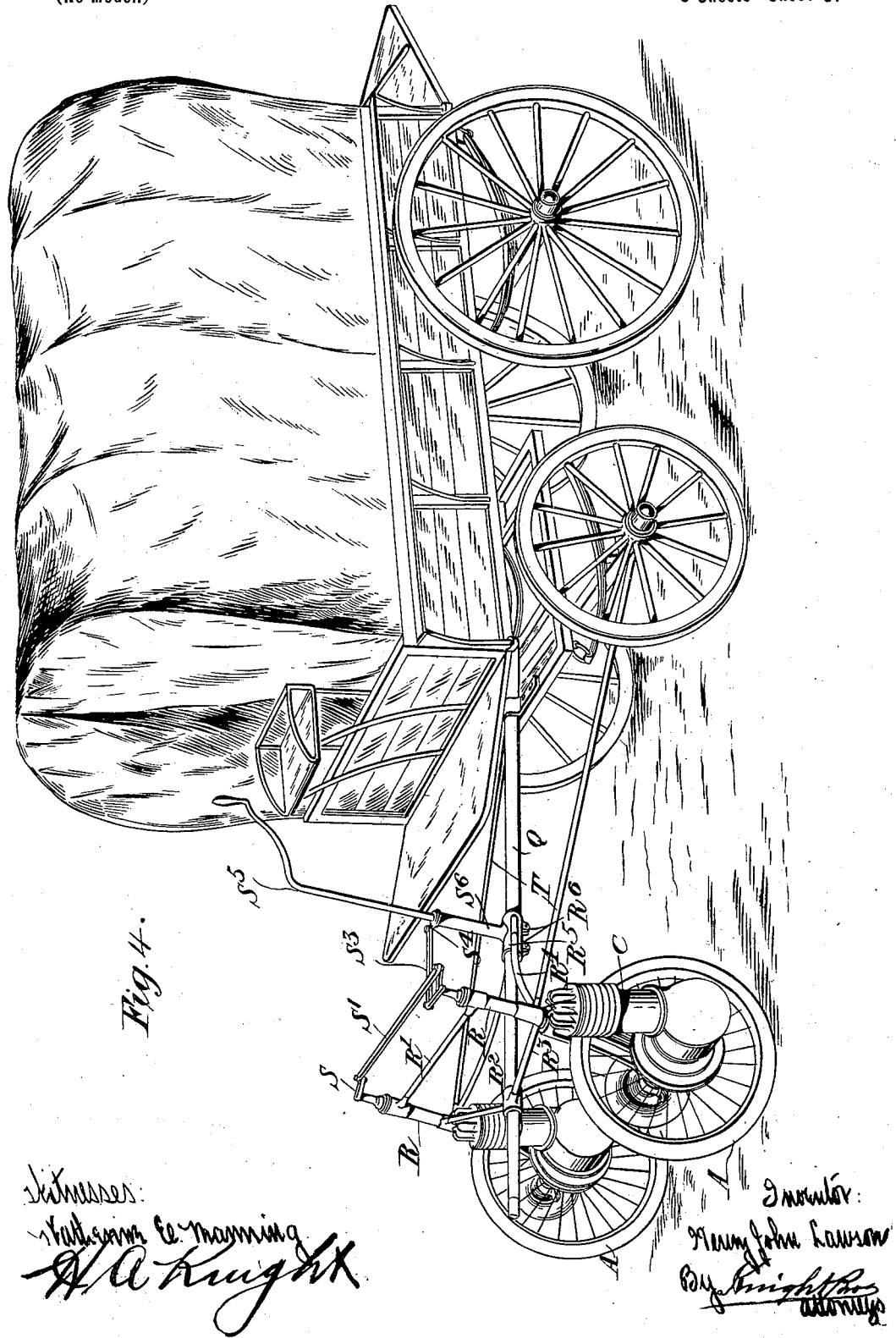

UNITED STATES PATENT OFFICE.

HENRY JOHN LAWSON, OF LONDON, ENGLAND.

MOTOR-VEHICLE.

SPECIFICATION forming part of Letters Patent No. 658,068, dated September 18, 1900.

Application filed January 31, 1900. Serial No. 3,420. (No model.)

*To all whom it may concern:*

Be it known that I, HENRY JOHN LAWSON, a subject of the Queen of England, residing at London, England, have invented certain new and useful Improvements in or Relating to Motor Driving Mechanisms and Motor-Vehicles, (for which application for patent has been made in Great Britain under No. 14,884, dated July 19, 1899,) of which the following is a specification.

This invention relates to certain improvements in motor driving mechanisms adapted for attachment to existing forms of horse-drawn vehicles, and further relates to improvements in vehicles provided with such motor driving mechanisms.

According to one method of carrying out this invention the motor is mounted upon one side of the road-wheel it is desired to drive and is supported by one blade of the fork or other member of the vehicle-frame within which the road-wheel or, as it is hereinafter called, the "driving-wheel," is mounted. A friction-clutch is interposed between the motor and the driving-wheel, the two parts of the clutch being kept normally in engagement with one another by means of a spring. The part of the clutch connected to the driving-wheel is provided with radial arms connected to the rim of the wheel by springs. By this means shock is avoided when the friction-clutch is brought into operation, as the springs secured to the radial arms of the clutch and connected to the rim of the wheel extend when the clutch is brought into action, so that the wheel is started gradually. In addition to this clutch the motor may, if preferred, be arranged to slide, so that it may be moved into or out of gear with the driving member of the friction-clutch.

In applying the driving mechanisms to vehicles they may be provided with suitable frames adapted to be readily attached to or removed from the shafts of ordinary horse-drawn vehicles. Thus two motor mechanisms may be arranged one at the side of or beneath each shaft of the vehicle and adapted to be steered together though driving independently of each other. In the case of a two-horse vehicle having a central pole a driving mechanism may be placed on each side of the pole and arranged in a similar manner to those secured to the shafts of a one-horse vehicle.

In the accompanying drawings, Figure 1 is a central vertical section of a motor mechanism constructed according to one method of carrying out this invention. Fig. 2 is a side elevation of a modification of the apparatus shown in Fig. 1. Fig. 3 is a perspective view of a one-horse vehicle provided with two motor driving mechanisms, and Fig. 4 is a perspective view of a two-horse vehicle similarly provided with two motor driving mechanisms.

The driving-wheel A is mounted in any convenient manner upon ball-bearings $A'$, carried by a fixed axle $A^2$. The axle $A^2$ is secured in any well-known manner to uprights B $B'$, respectively, adapted for ready attachment to any convenient part of the frame of a horse-drawn vehicle. A motor C of any well-known type is secured to the member $B'$ by brackets. (Not shown in the drawings.) Mounted free on an extension of the hub $A^3$ of the driving-wheel is a recessed disk D, forming one part of the friction-clutch. Secured to the part D are one or more radial arms $D'$, connected at their ends by springs $D^2$ to the rim of the driving-wheel A. A cone $D^3$, forming the second part of the friction-clutch, is mounted free on the axle $A^2$, and secured to or integral with it is a spur-wheel E. The spur-wheel E gears with a pinion $E'$, carried fast on the motor-shaft $E^2$. A spring F, secured to the member $B'$, is bifurcated at its lower end, so that one arm passes on either side of the axle $A^2$ and bears against the wheel E. The spring F is arranged in such a manner that it always tends to force the wheel E, with its clutch part $D^3$, toward the clutch part D, so that the members D $D^3$ shall engage one another in a well-known manner. To prevent friction between the bifurcated end of the spring F and that part of the wheel E against which it bears, ball-bearings are arranged between these two parts. One race G of the ball-bearings may be secured to or made integral with the wheel E, while the other race $G'$ may be secured to the spring F or may comprise a free ring kept in place by the tension of the spring. To prevent one race from being drawn away from the other by the withdrawal of the spring F, the spring may be provided with a lug $F'$, having a flanged edge or lip F², adapted to engage the race G, which is secured to the wheel E. To bring the parts D D³ of the clutch out from engagement with one another, a fork H is provided, which engages with an annular recess E³ on the boss of the wheel E and is pivoted to the motor-casing at H'. A lever H² extends from the fork H beyond the point H', where it is pivoted, so that by moving this lever in the direction indicated by the arrow the wheel E, with its clutch part D³, may be moved back against the action of the spring F, so that the part D³ is brought out from its engagement with the part D. The operation of this device is obvious. The motor is started while the friction-clutch is out of engagement, and when started the lever H², which may be operated by any well-known device, is released, so that the spring F forces the wheel E, with its clutch part D³, toward the clutch part D. The clutch is thus brought into action, and the radial arm or arms D', secured to the clutch part D, will immediately move in the same direction as the wheel E. This first movement will cause the springs D² to extend, so that the driving-wheel A is gradually started, thus obviating shock.

Fig. 2 shows a motor driving mechanism provided with a friction-clutch in the same manner as the mechanism shown in Fig. 1, but having in addition to this a device by which the pinion E' may be brought out from its engagement with the wheel E. The motor C is in this case secured to brackets J, rigidly attached to or forming part of a sliding piece J'. The part J' is preferably bevel-edged and slides in a plate J², rigidly connected to the member B' of the vehicle-frame. A lever K has secured to it an eccentric K' and is provided with a pin or axle (not shown in the drawings) which enters the member B', but is free to turn in the same. The eccentric K' lies in and engages a slot or recess K² in the sliding member J'. The eccentric K' only bears against the upper and lower sides of the slot. The eccentric is thus free to turn in the slot without moving the member J' in a transverse direction, but is compelled to raise or lower it in the grooved plate J². To operate the lever K, any convenient device may be connected to it by means of the rod K². When the lever K is raised, as shown in full lines in the drawings, the summit of the eccentric is raised, and thus the sliding member J' is drawn toward the upper end of the grooved plate J². If now the lever K² is depressed, as indicated by the arrow, the lever K will take up the position indicated in dotted lines and the eccentric will be partially or entirely inverted. This movement will cause the part J' to slide down the part J², carrying with it the bracket J and the motor C, so that the pinion E' on the motor-shaft E² will be brought out of mesh from the wheel E.

Fig. 3 illustrates the method of attaching two motor driving mechanisms to the shafts of a "sulky." Each motor driving mechanism is mounted between members resembling the blades of a cycle-fork and are free to turn in sockets N. The sockets N are braced together by transverse members N'. The upper end of each of the sockets is secured to one of the shafts of the vehicle by a split lug N², clamped upon the shaft by a bolt N³. The lower end of each socket carries a bracket N⁴, by which it is braced to the vehicle-shaft at N⁵. The bracket N⁴ may be secured to the shaft at N⁵ by a strap N⁶ or by any other convenient device which may be readily attached to or detached from the shaft. The stems of each pair of members B B' are carried up from the sockets N, above which each is provided with a horizontal steering-lever O. The steering-levers O are connected together by a tie O', pivoted to any convenient part of the levers O, so that the motor mechanisms will be steered together. Each lever O is provided with a steering-handle O², one of which is held in each hand of the driver. Levers P may be arranged in close proximity to the steering-handles O² and connected by any convenient lever mechanism to the valve for admitting air to the carbureter or carbureted air to the motor for the purpose of regulating the speed of the latter in the well-known manner. The particular construction of motor mechanism shown in this figure forms no part of the present invention; but it will be understood that any of the motor mechanisms shown in Figs. 1 and 2 may be similarly adapted for attachment to the shafts of the vehicle.

Fig. 4 illustrates a two-horse vehicle having a central pole Q, on either side of which is arranged a motor driving mechanism. The motor mechanisms are carried by forks arranged similarly to those described with reference to Fig. 3, the stems of the forks being free to turn in steering-sockets R. The upper ends of the steering-sockets R are braced together by a strut R', and the lower ends of the same are connected to a ferrule or socket R² by forward struts R³. The ferrule or socket R² is of such dimensions that the pole Q may be readily passed through it. To secure the motor mechanisms to the pole, they are provided with struts R⁴, connected to the rear side of the lower ends of the sockets R and to a split lug R⁵. The split lug R⁵ is adapted to be passed over the pole Q and clamped upon the same by means of bolts R⁶. The stems of the forks which carry the motor mechanism project beyond the sockets R, within which they are free to revolve, and are provided with levers S, connected by a rod S', so that the two wheels may be steered simultaneously. To operate the steering, one of the stems carries a lever S², connected by a link S³ to a second lever S⁴, fast upon a steering-rod S⁵. The steering-rod S⁵ is carried by and free to turn in a socket S⁶, secured to or integral with the split lug R⁵. It will be observed that this method of securing the motor driving mechanisms to the pole of the vehicle renders the whole apparatus readily detachable, as it is only necessary to release the bolts R⁶ to remove the whole of the apparatus from the vehicle. The bolts R⁶ being released allow the split lug R⁵ to spring open. The lug R⁵ and ferrule or socket R² may then be drawn off the pole, bringing with them the whole of the framework by which the steering-sockets R are connected, together with the whole of the steering mechanism. Levers may be arranged upon the steering-rod S⁵ in close proximity to the handle by which it is operated for the control of the motors.

To further strengthen the connection between the motor driving mechanisms and the vehicle to which they are attached, longitudinal members or ties, such as T, may be arranged to connect the base of the steering-tube of each mechanism to the axle or any other convenient part of the vehicle-frame which turns with the front road-wheels. These ties may conveniently be constructed of tubing flattened out at those ends by which they are secured to the axle of the vehicle. The flattened ends may be secured to the axle by means of bolts in any well-known manner. These longitudinal members T, as well as the other parts of the frame by which the motor driving mechanisms are secured to the vehicle, may be attached to the same, if preferred, by means of straps in place of bolts or clamps.

The driving mechanisms described above may obviously, if desired, be provided with fly-wheels after the manner set forth in my Letters Patent No. 633,014, dated September 12, 1899.

What I claim as my invention, and desire to secure by Letters Patent, is—

1. In a motor driving apparatus, the combination of a driving-wheel, a hub therefor, bearings for that hub, supports to carry the bearings, a motor mounted on the outside of one of the supports and of the wheel, a pinion on the motor-shaft eccentric to the driving-wheel, a free clutch part, gearing between this clutch part and the motor-pinion, a second clutch part arranged concentric with the first and adapted to engage the same, and means whereby one clutch part may be moved toward and away from the other substantially as set forth.

2. In a motor driving apparatus the combination of a driving-wheel, a hub therefor, bearings for that hub, supports to carry the bearings, a motor mounted on the outside of one of the supports and of the wheel, a pinion on the motor-shaft eccentric to the driving-wheel, a free clutch part, means for supporting that clutch part, gearing between the said clutch part and the motor-pinion, a second clutch part adapted to engage the first means for supporting this second clutch part, means whereby one clutch part may be moved toward and away from the other, a projection on the said second clutch part and a spring connecting this projection to the rim of the driving-wheel substantially as set forth.

3. In a motor driving apparatus the combination of a driving-wheel, a hub therefor, bearings for that hub, supports to carry the bearings, a motor mounted on the outside of one of the supports and of the driving-wheel, a pinion on the motor-shaft eccentric to the driving-wheel, a clutch making driving connection between said pinion and the driving-wheel, a spring which always tends to bring the parts of the clutch into contact with each other, and means whereby the two clutch parts may be separated, substantially as described.

4. In a motor driving apparatus the combination of a driving-wheel, a hub therefor, bearings for that hub, supports to carry the bearings, a motor mounted on the outside of one of the supports, a pinion on the motor-shaft eccentric to the driving-wheel, a free clutch part means for supporting that clutch part, gearing between the said clutch part and the motor-pinion, a second clutch part arranged concentric with the first and adapted to engage the same, means for supporting this second clutch part, a spring which always tends to bring the one clutch part into contact with the other, means whereby the two clutch parts may be separated, a projection from said second clutch part and a spring connecting this projection to the rim of the driving-wheel substantially as described.

5. In a motor driving apparatus the combination of a fixed axle, supports carrying that axle, a driving-wheel mounted upon the axle between the supports, a motor mounted on the outside of one of the supports and of the wheel, a pinion on the motor-shaft eccentric to the driving-wheel, a free clutch part arranged between the same and the support carrying the motor means for supporting that clutch part, gearing between the said clutch part and the motor-pinion, a second clutch part arranged concentric with the first and adapted to engage the same, means for supporting this second clutch part, a spring which always tends to bring the one clutch part into contact with the other, means whereby the two clutch parts may be separated, a projection from said second clutch part and a spring exterior to the driving-wheel and connecting this projection to the rim thereof substantially as described.

6. In a motor driving apparatus the combination of a driving-wheel, supports to carry the driving-wheel, a motor mounted through the medium of a sliding connection on the opposite side of one of the supports to the driving-wheel, means for controlling the movements of the motor on the support, a suitable driving connection between the motor-shaft and driving-wheel including a clutch, and means for controlling said clutch.

7. In a motor driving apparatus the combination of a driving-wheel, supports for the driving-wheel, a motor, a sliding connection through which the motor is secured on the side of a support opposite to the driving-wheels, means for controlling the movements of the motor on the support, a driving connection between the motor and the driving-wheel, including means for controlling said driving connection through said clutch, and a spring connecting one part of said clutch to the rim of the driving-wheel substantially as set forth.

8. In a motor driving apparatus the combination of a fixed axle, supports carrying that axle, a driving-wheel mounted upon the axle between the supports, a motor on the side of one of the supports opposite the wheel and a sliding bracket whereby the motor is secured to the support, means whereby the bracket with the motor may be raised or lowered on the support, a driving connection between the motor and the driving-wheel, a clutch controlling said connection, means whereby the clutch is controlled, and a spring connection between one part of the clutch and the rim of the driving-wheel, substantially as described.

9. In a motor driving apparatus the combination of a driving-wheel, a support for said driving-wheel, a motor on the outside of the supports and of the driving-wheel, a sliding connection whereby the motor is secured to the support, means for controlling the movements of the motor on the support, and a suitable gearing between the said motor and the driving-wheel, substantially as set forth.

10. In a motor driving apparatus the combination of a fixed axle, supports carrying that axle, a driving-wheel mounted upon the axle between the supports, a motor mounted on the outside of one of the supports, a sliding bracket whereby the motor is secured to the support, means whereby the bracket with the motor may be raised or lowered on the support and suitable driving connection between the motor and the driving-wheel.

11. In a motor-driven vehicle the combination with a vehicle having a draft tongue or shafts; of two complete motor driving mechanisms each including a propelling-wheel, a support for each driving mechanism and wheel, steering-sockets to receive the said supports, braces connecting the steering-sockets, means for steering the supports, and means whereby the said steering-sockets may be attached to the tongue or shafts of the vehicle, substantially as set forth.

12. In a motor-driven vehicle the combination with a vehicle of two complete driving mechanisms each including a traction or propelling wheel independent of the supporting-wheels of the vehicle, supports for each motor mechanism and wheel-steering sockets for the supports of the motor driving mechanisms, braces connecting the steering-sockets and means whereby the steering-sockets may be connected to the pole of the vehicle, substantially as set forth.

13. A motor draft appliance for vehicles, comprising two traction-wheels, a frame spacing them apart in fixed relation, independent motors mounted on said frame, outside of and in driving relation to the respective traction-wheels, and means for attaching said frame to the ordinary pole or shafts of a vehicle.

14. A motor draft appliance for attachment to vehicles without removal of the supporting-wheels of the latter, comprising a pair of traction-wheels, independent motors laterally disposed in driving relation to the respective wheels, suitable independent supports for the wheels and their motors, and a frame in which said supports have steering-bearings, and by which the wheels are spaced apart, and means for connecting said frame to the ordinary pole or shafts of the vehicle.

15. In combination with a vehicle, a motor traction device therefor, comprising a pair of traction-wheels, motors for said wheels, a frame by which said wheels and motors are mounted in fixed relation, means for connecting said frame to the ordinary draft tongue or shafts of the vehicle, and braces for strengthening said tongue or shafts in the directions of stress or strains imposed thereon by the traction-motors.

16. In combination with a vehicle, a motor traction appliance therefor, comprising a pair of traction-wheels, a pair of motors for said wheels, a frame by which said wheels and their motors are mounted in fixed relation, means for attaching the said frame to the ordinary draft appliance of the vehicle, consisting of sockets for receiving said draft appliance, and braces extending between the frame and the draft appliance for strengthening said connection.

In testimony whereof I have signed my name to this specification in the presence of two subscribing witnesses.

HENRY JOHN LAWSON.

Witnesses:
EDWIN S. CLARKSON,
HERVEY S. KNIGHT.